Patented Apr. 22, 1947

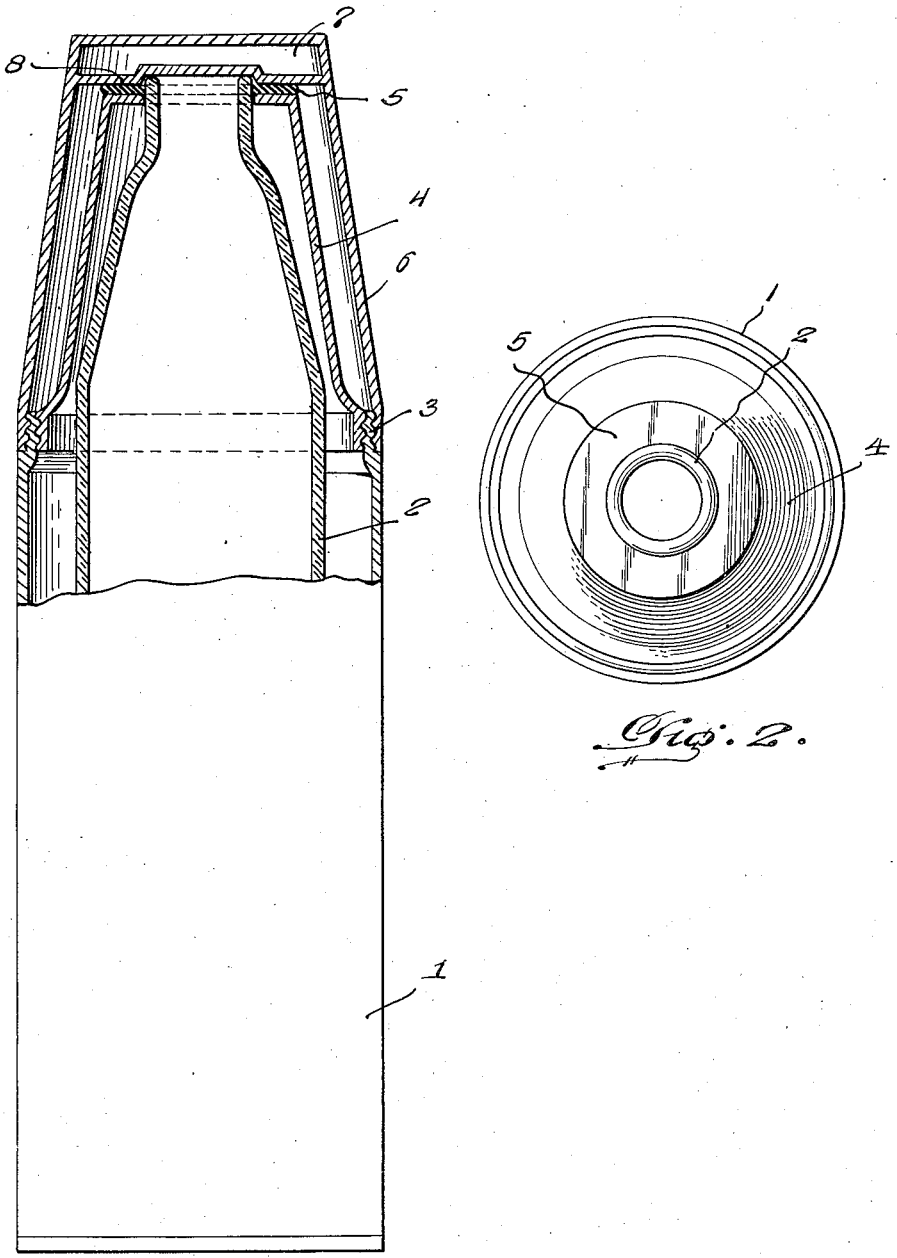

2,419,291

UNITED STATES PATENT OFFICE 2,419,291

VACUUM BOTTLE

Albert M. Senter, Jr., Albuquerque, N. Mex.

Application May 25, 1945, Serial No. 595,831

5 Claims. (Cl. 215—13)

This invention relates to beverage containers, and more particularly to vacuum bottles.

A main object of this invention is to provide a novel and improved vacuum bottle wherein no cork is necessary.

A further object of this invention is to provide a new and improved construction for a beverage container such as a vacuum bottle wherein an important feature resides in an improved closure means for the container.

Further objects and advantages of the invention will appear from the following description and claims, and from the accompanying drawings, wherein:

Figure 1 is an elevational view with parts in section of a vacuum bottle constructed in accordance with this invention.

Figure 2 is a top view of the bottle of Figure 1 with the cover removed.

Referring to the drawings, 1 designates a vacuum bottle housing containing an inner vacuum container 2 normally secured within the housing of the vacuum bottle, said housing being formed with an inwardly offset upper rim portion 3 provided with internal and external threads. Threadedly engaging the internal threads of rim portion 3 is a generally conical retainer member 4 which is formed with an aperture in its top wall engaging the neck portion of vacuum container 2 to hold said container in position within the bottle housing 1. Encircling the neck of container 2 above the top wall of retainer member 4 is an annular gasket member 5, said gasket member being in tight frictional engagement with the neck of container 2 and normally lying flat on said top wall. Gasket member 5 is composed of rubber or similar resilient deformable material.

In closed condition, the outer threads of rim portion 3 are threadedly engaged by the lower portion of an inverted cup member 6 which also serves as a closure means for the vacuum bottle. The base wall or portion of cup member 6 is provided with an air space 7 and is further provided with an annular shoulder portion 8 adapted to be tightly engaged with gasket member 5 in sealing relationship thereto when cup member 6 is screwed tight on rim portion 3. In this position, vacuum container 2 is securely sealed, and the top portion of its pouring neck is maintained substantially in thermally insulated relationship to the outer surfaces of the vacuum bottle.

It is thus apparent that no cork is necessary to seal the neck of the inner vacuum container and that the inner vacuum container is securely supported at its upper portion against shock and vibration.

A vacuum container according to this invention can be satisfactorily employed for hot or cold liquids, carbonated beverages or other similar fluids whose temperature it is desired to maintain substantially constant over periods of time.

While a specific embodiment of a beverage container has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A beverage container comprising an outer housing, an inner vessel within said housing in substantially spaced relation to said housing, said vessel being formed with a neck portion defining an opening at the top, means secured to said housing engaging said neck portion and defining a substantially flat area around said neck portion, a substantially flat annular deformable gasket member frictionally engaging said neck portion and adapted to bear on said flat area around said neck portion, an inverted cup member adapted to be detachably engaged with said housing in overlying relation to said neck portion, said cup member being provided with an inner base portion recessed to receive the top of said neck portion and formed with an annular shoulder adapted to bear on said gasket member to seal the opening.

2. The structure of claim 1, and wherein said inner base portion is hollow to define an air space between its inner and outer surfaces.

3. A beverage container comprising an outer generally cylindrical housing formed with an inwardly offset rim portion, said rim portion having internal and external threads, an inner vessel within said housing, said vessel being formed with a neck portion defining an opening at the top, an inverted generally conical member having a lower flared portion threadedly engaged with the internal threads of said rim portion and formed with a flat top portion having an opening through which said neck portion projects, a flat annular deformable gasket member frictionally engaging said neck portion and adapted to bear on said flat top portion around said neck portion, an inverted cup member adapted to be threadedly engaged with the external threads of said rim portion in overlying relation to said neck portion, said cup member being provided with an inner base portion recessed to receive the top of said neck portion and formed with an annular shoulder adapted to bear on said gasket member to seal the opening.

4. The structure of claim 3, and wherein said inner base portion is hollow to define an air space between its inner and outer surfaces.

5. The structure of claim 3, and wherein said inner base portion is hollow to define an air space therein, and wherein the side wall of said cup member is spaced from the surface of the conical member to define an air space between said side wall and said surface.

ALBERT M. SENTER, Jr.

REFERENCES CITED

The following references are of record in the file of this patent:

UNITED STATES PATENTS

| Number | Name | Date |
|---|---|---|
| 1,706,034 | Moore | Mar. 19, 1929 |
| 2,207,543 | Knapp | July 9, 1940 |
| 2,324,253 | Anderson | July 13, 1943 |
| 1,749,432 | Kriege | Mar. 4, 1930 |
| 1,721,311 | Muenchen | July 16, 1929 |

FOREIGN PATENTS

| Number | Country | Date |
|---|---|---|
| 422,229 | Britain | Jan. 8, 1935 |
| 47,496 | Switzerland | Feb. 27, 1909 |
| 40,711 | Norway | Jan. 5, 1925 |